Figure 4:
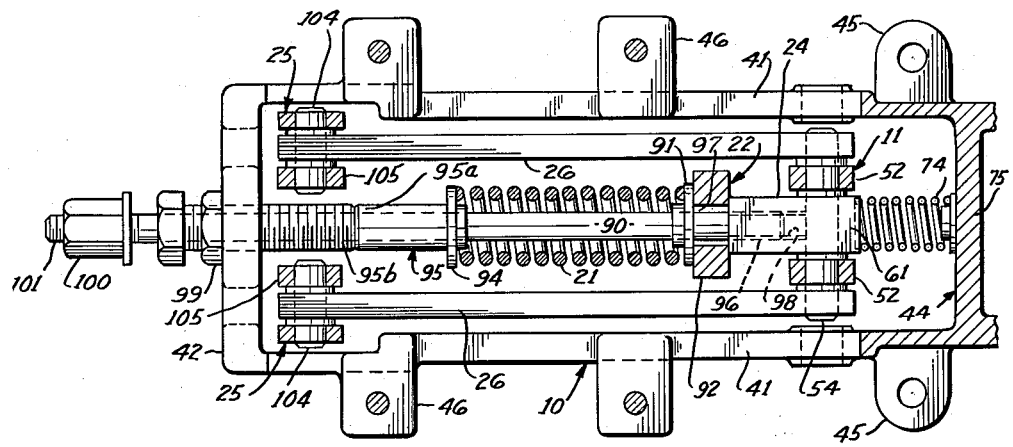

March 28, 1961 J. D. LEITCH 2,976,963
ELECTROMAGNETICALLY APPLIED AND RELEASED BRAKE
Filed April 30, 1957 3 Sheets-Sheet 1
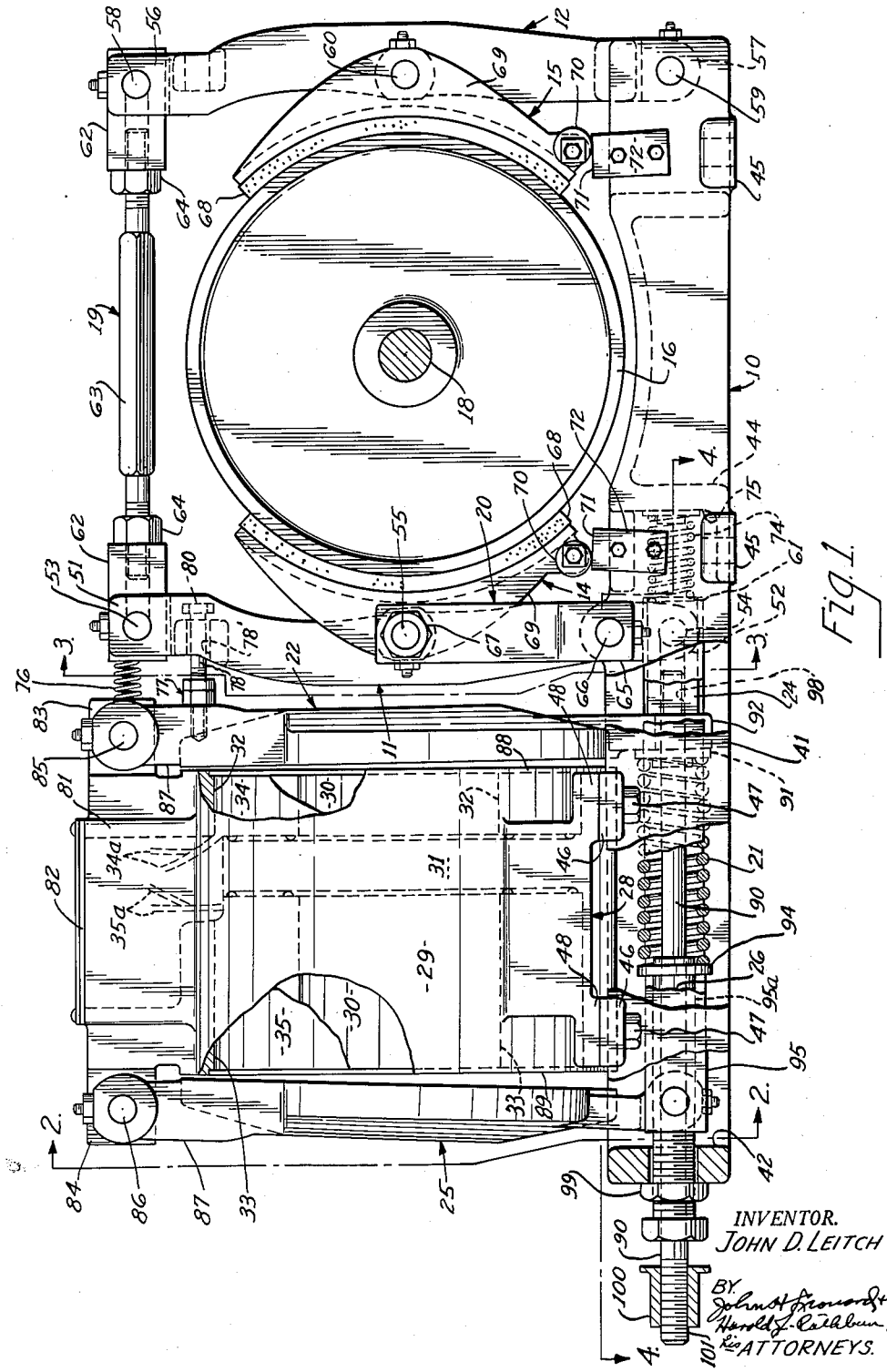
INVENTOR.
JOHN D. LEITCH
BY
ATTORNEYS.

March 28, 1961 J. D. LEITCH 2,976,963
ELECTROMAGNETICALLY APPLIED AND RELEASED BRAKE
Filed April 30, 1957 3 Sheets-Sheet 2
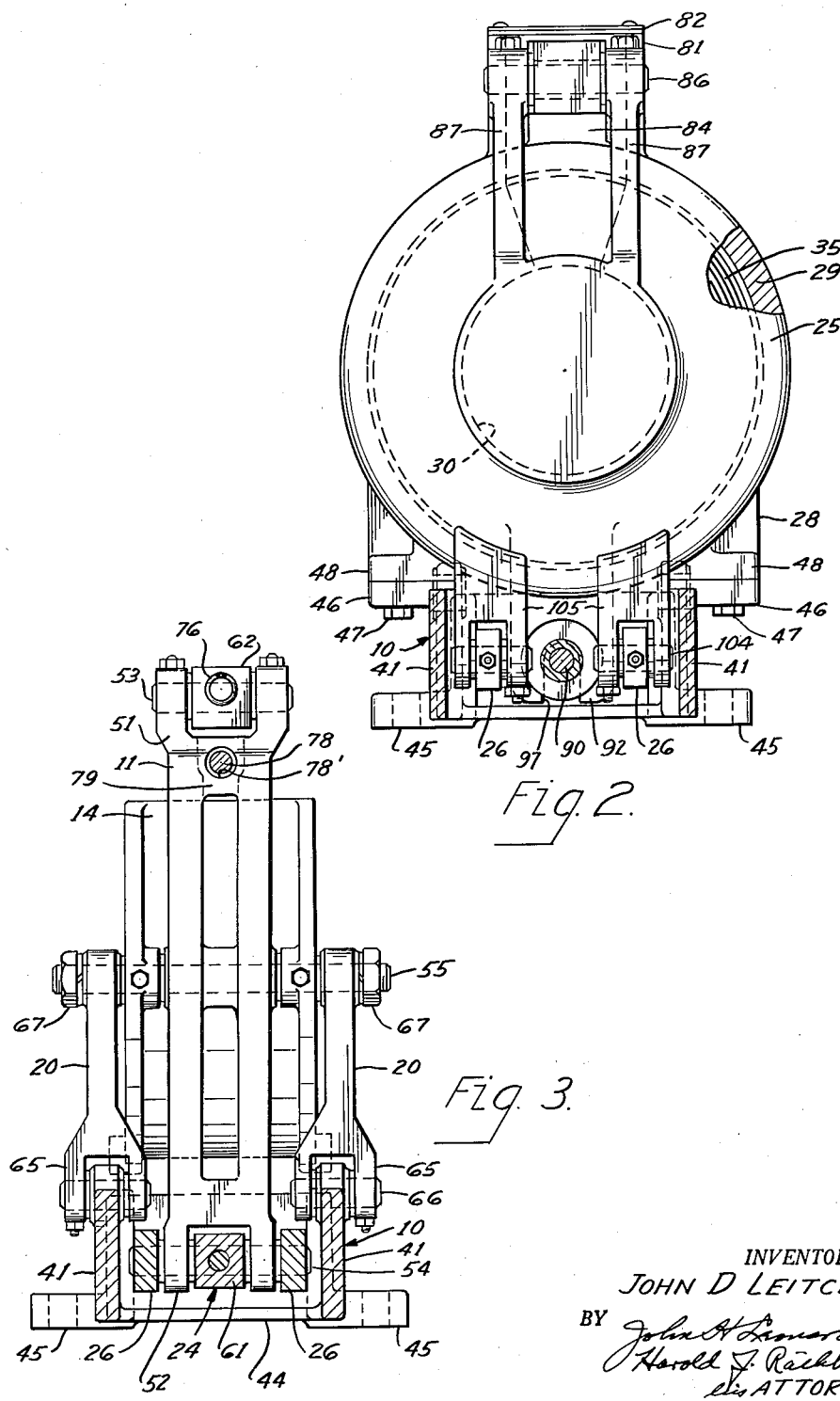
INVENTOR.
JOHN D LEITCH
BY
ATTORNEYS March 28, 1961      J. D. LEITCH      2,976,963
ELECTROMAGNETICALLY APPLIED AND RELEASED BRAKE
Filed April 30, 1957      3 Sheets-Sheet 3

INVENTOR.
JOHN D. LEITCH
BY
ATTORNEYS.

United States Patent Office 2,976,963
Patented Mar. 28, 1961

2,976,963
ELECTROMAGNETICALLY APPLIED AND RELEASED BRAKE

John D. Leitch, Grosse Pointe Park, Mich., assignor to Square D Company, Detroit, Mich., a corporation of Michigan Filed Apr. 30, 1957, Ser. No. 656,036

7 Claims. (Cl. 188—105)

This invention relates to brakes, and more particularly to an industrial brake which is both released and applied electromagnetically and which is also applied automatically by mechanical means upon disconnection, or accidental failure, of electric power.

In the operation of many industrial mechanisms, for example, the bridges of electric overhead traveling cranes, it is desirable to control the degree of brake application electrically and yet to have full braking force applied automatically upon failure of power. Heretofore, an electrically operated brake having these capabilities and also suitable for industrial applications has not been available, and resort has had to be made to hydraulic or pneumatic means for controlling the brake torque or degree of brake application. Hydraulic and pneumatic brakes have numerous disadvantages, and in their simpler forms cannot be used at all when the structure on which the brake is mounted moves materially with respect to the control station.

One of the objects of this invention is to provide an improved industrial brake including electrically operated means for varying its torque electrically.

Another object is to provide an improved brake which is held applied by a spring under certain conditions, and which, under other conditions, can be applied and released by the control of electromagnetic force without interference by the spring.

Another object is to provide an improved electromagnetic operating means for a spring-applied brake which, as long as electric power is available, is operable to nullify the applying force of the spring and concurrently is operable to apply and release the brake and to control the amount of its torque.

Another object is to provide an improved industrial brake which is held applied by a spring whenever electric power is not available, and which can be released and applied by control of electric power when power is available without the necessity of de-activating the spring during each release of the brake.

Prior known all-electric brakes of this general type have not been suitable for industrial applications, and have required the energization of two coils to de-activate the spring and subsequent deenergization of one of the coils to release the brake. A complicated control system for these prior brakes is necessary because of the required energization and subsequent deenergization of one of the coils. In the brake of the present invention, two operating coils are provided in a compact unitary structure. After one of the coils is energized to compress the spring, the other coil can be energized in selectable amounts to control the brake torque throughout the full torque range.

Briefly, the brake described herein comprises two coaxial coils which cooperate with respective armatures arranged to control the application of brake shoes to a brake wheel. One of the armatures is operated by one of the coils to activate a brake-applying spring so that it becomes operative to apply the brake, and to deactivate the spring so that it discontinues the application of braking force. In the example herein, the spring is shown as a compression spring and is de-activated by increasing its compression. The other armature is operative, while the spring is de-activated, to apply the shoes to the wheel with a force related to the amount of current in its associated coil.

Figure 5:
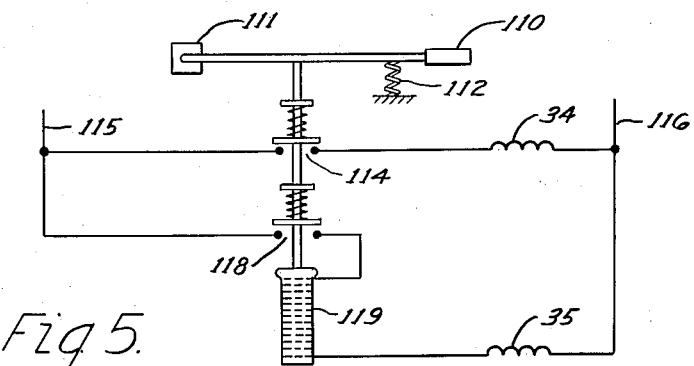
Figure 6:
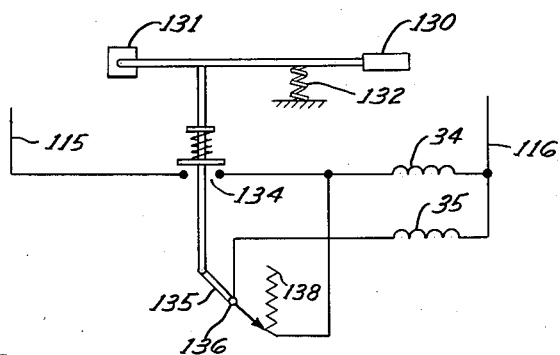

Other objects and advantages of this invention will become apparent from the following description wherein reference is made to the drawings, in which:

Fig. 1 is a side elevation of a brake in accordance with this invention;

Figs. 2, 3, and 4 are sectional views taken generally as indicated by the lines 2—2, 3—3, and 4—4 in Fig. 1, respectively, parts thereof being shown, in each, in elevation for clearness of illustration, and Figs. 5 and 6 are wiring diagrams illustrating exemplary control systems for the brake.

Referring to the general structure of the brake shown in the drawings, the brake comprises a suitable base 10 and inner and outer upstanding shoe levers 11 and 12 carrying brake shoes 14 and 15, respectively, for cooperation with a brake wheel 16 rotatable with a shaft 18 forming part of a mechanism such as a crane bridge driven by an electric motor (not shown). The outer shoe lever 12 at its lower end portion is pivoted on the base 10 and at its upper end portion is connected to an upper end portion of the inner shoe lever 11 by an adjustable tie-rod 19 disposed above the wheel 16. The shoe lever 11 is pivoted intermediate of its ends at upper end portions of a pair of spaced supports 20 which are, in turn, at their lower end portions, pivoted on the base 10.

In accordance with this invention, the shoes 14 and 15 are normally applied to the wheel 16 by a helical compression spring 21, disposed within the base 10, which urges a lower extension of a generally disc-shaped armature plate 22 against a thrust rod 24 to force a lower end portion of the lever 11 to the right as viewed in Fig. 1. The spring 21 is de-activated, or rendered inoperative, upon movement of the lower end extension of the armature 22 to the left. The shoes 14 and 15 are also applied to the wheel 16, when the compression spring 21 is inoperative, by force exerted by a generally disc-shaped armature plate 25 which is connected at its lower end portion to the lower end portion of the inner shoe lever 11 by a pair of spaced bars 26 disposed within the base 10 on opposite sides of the spring 21.

The armature plate 22 is pivoted at its upper end portion to an upper portion of a cylindrical magnet housing 28 on the side of the housing nearest the brake wheel 16, and the armature plate 25 is similarly pivoted at its upper end portion to an upper portion of the housing 28 on the side thereof most remote from the brake wheel 16.

The magnet housing 28 has an annular outer pole portion 29, an axially disposed central core or pole portion 30, and an intermediate radially disposed annular web portion 31 defining, within the housing 28, coaxial annular coil-receiving chambers 32 and 33. An annular coil 34 in the chamber 32 is arranged to control operation of the armature plate 22, and an annular coil 35 in the chamber 33 is arranged to control operation of the armature plate 25.

Referring now to the structure of the brake in greater detail, the base 10 comprises a pair of spaced side members 41 interconnected at the magnet end by a transverse end portion 42 and in the region under the wheel by a relatively wide inverted channel-like portion 44. Suitable bolt-receiving lugs 45 are provided at spaced intervals along the side members 41 to facilitate holding the brake in position on a flat surface. Pairs of spaced brackets 46 extending outwardly from each of the side members 41 receive respective cap screws 47 threaded into respective complementary lugs 48 on the magnet housing 28 thus to secure the housing to the base 10.

The inner shoe lever 11 has upper and lower bifurcated end portions 51 and 52 which receive respective pins 53 and 54 and, at its central portion, rotatably receives a pin 55. The outer shoe lever 12 is similar and has upper and lower bifurcated portions 56 and 57 which receive pins 58 and 59, respectively, and, at its central portion, rotatably receives a pin 60.

The bifurcated lower end portion 52 of the inner shoe lever 11 rotates on the pin 54 which is secured at its opposite ends to the inner end portions of the bars 26, respectively, and which rotatably carries intermediate of the bifurcations of the end portion 52 an inner end portion 61 of the thrust rod 24. The lower end portion 57 of the outer shoe lever 12 rotates on the pin 59 which is secured at its opposite ends to respective side members 41 of the base 10.

The pin 53 at the upper end portion 51 of the inner lever 11 is secured at its opposite ends to the respective bifurcations of the lever 11 and rotatably carries between the bifurcations a threaded head portion 62 of the tie-rod 19 and the pin 58 at the upper end portion 56 of the outer lever 12 is similarly secured at its opposite ends to the respective bifurcations of the lever 12 and rotatably carries another head portion 62 of the tie-rod 19. The head portions 62 are adjustably interconnected by a generally hexagonal bolt 63 having its opposite ends threaded and adjustably screwed into the respective head portions 62 and locked in an adjusted position by nuts 64.

The pin 55 at the central portion of the inner shoe lever 11 is rotatably supported at spaced intermediate portions by the respective supports 20 which are bifurcated at their lower end portions 65 and fixedly secured to respective pins 66 rotatably carried by the respective side members 41. The outermost end portions of the pin 55 are threaded and receive respective nuts 67.

The brake shoe 14 is fixed to the pin 55 and the brake shoe 15 is rotatably supported on the pin 60. Each of the shoes has a friction lining 68 and, at the face opposite the lining, has a pair of laterally spaced flanges 69 which have openings, respectively, receiving the associated ones of the pins 55 and 60. As is apparent, when the shoes 14 and 15 are separated from the wheel 16, gravity tends to cause their upper ends to tilt toward the wheel. To prevent this tilting and thus to prevent the uppermost inner corners of the linings 68 from rubbing on the wheel when the brake is released, each of the shoes 14 and 15 is provided, at its lower end portion, with an eccentric cam 70 adjustably positioned to engage a stop surface 71 defined by the upper edge of a plate 72 secured to one of the side members 41. Each of the stop surfaces 71 is so shaped and positioned, and its associated cam 70 is so adjusted that, irrespective of the adjusted positions of the shoes 14 and 15, the shoes will become concentric with the wheel 16 when the brake is released. Such anti-tilt means are described and claimed in a copending application of Arthur L. Ward, Serial No. 436,353, filed June 14, 1954, now Patent No. 2,871,994. It is apparent that other suitable anti-tilt means may be used if desired.

From the foregoing, it will be apparent that when the lower end portion 52 of the inner shoe lever 11 is forced to the right, as viewed in Fig. 1, the shoes 14 and 15 are forced against the wheel 16, and, when the lower end portion 52 is forced to the left, this shoe-applying force is relieved. For moving the shoes 14 and 15 away from the wheel when all applying forces are relieved, a suitable return means is provided. This return means in the form shown is a helical compression spring 74 interposed between an inner wall 75 of the base portion 44 and the inner end portion 61 of the thrust rod 24. The spring 74 forces the lower end portion 52 of the lever 11 to the left, and a helical compression spring 76, interposed between the magnet case 28 and the inner head 62 of the tie-bolt 19, forces the upper end portions 51 and 56 of the shoe levers 11 and 12 to the right.

An adjustable stop means 77 for insuring proper shoe clearance comprises a bolt 78 adjustably threaded into the armature plate 22 and loosely received in an opening 78' in a web portion 79 of the inner shoe lever 11 adjacent the end portion 51. A head portion 80 of the bolt 78 thus serves as an adjustable stop for determining the clearance between the shoes 14 and 15 and the wheel 16 when the brake is released.

Turning now to details of the operating magnet, the magnet housing 28 has a terminal box 81 on its upper surface provided with a removable top cover 82. Lugs 83 and 84 at opposite ends of the terminal box 81 extend outwardly from the respective end faces of the housing 28 and rotatably receive pins 85 and 86, respectively, secured at their outer end portions in upstanding spaced ear portions 87 of the respective armature plates 22 and 25. Cover-plates 88 and 89 enclose the respective coil receiving chambers 32 and 33. Leads 34a and 35a from the coils 34 and 35, respectively, enter the terminal box 81 for connection to a controller such as hereinafter described. Preferably the coils 34 and 35 are so wound and connected to a power source that any flux produced by the winding 35 that might cross the air-gap between the outer pole 29 and the armature plate 22 is in the same direction as the flux across that air-gap produced by the winding 34. This prevents inadvertent release of the armature 22 upon strong energization of the winding 35.

The brake-applying spring 21 is disposed around a manual-release rod 90 between an inner spring retainer 91, slidable along the rod 90 and abutting a depending portion or extension 92 of the armature plate 22, and an outer spring retainer 94 formed on an inner end portion 95a of a two-part torque adjustment sleeve 95 surrounding the rod 90 and having an outer coaxial portion 95b, (Fig. 4), adjustably threaded through an opening in the end wall 42. An inner end portion of the rod 90 is loosely received in a recess 97 in the depending portion 92 and is threaded into a bore 98 formed in the push rod 24. The length of the spring 21, and thus the spring-derived torque of the brake, can be adjusted by turning the sleeve portion 95b in the end wall 42, and the sleeve portion 95b can be locked in adjusted position by a nut 99. A nut 100 on a threaded outer end portion 101 of the rod 90 can be turned to compress the spring 21 and thereby effect manual release of the brake.

Outer end portions of the bars 26 are received on respective pins 104 rotatably secured to respective bifurcated end portions of a pair of lugs 105 which depend from the armature plate 25.

From the foregoing description, it will be seen that energization of the coil 34 causes clockwise rotation of the armature plate 22 as viewed in Fig. 1 and consequent compression of the brake-applying spring 21. This relieves the force from the lower end portion of the inner shoe lever 11 and the shoe lever 11 turns clockwise under the influence of the springs 74 and 76. The lever 11 pivots at the pin 55 upon this initial clockwise movement, forcing the lever 12 clockwise and moving the shoe 15 away from the wheel 16. When the web portion 78a strikes the stop head 80, pivotal movement can no longer occur at the pin 55 and the arms 20 pivot counter-clockwise at the pin 66 to move the shoe 14 away from the wheel 16.

When the coil 34 is deenergized, the spring 21 forces the armature 22 to swing in a counter-clockwise direction causing the push rod 24 to move the lower end portion 52 of the lever 11 to the right. This movement of the lever 11 causes the supports 20 to turn clockwise to apply the shoe 14 to the wheel 16. As soon as the shoe 14 engages the wheel, the lever 11 turns counter-clockwise at the pin 55 and pulls the lever 12 in a counter-clockwise direction and causes the shoe 15 to engage the wheel 16.

If, while the coil 34 is energized, the coil 35 is energized, the armature plate 25 turns counter-clockwise, as viewed in Fig. 1, and forces the spaced rods 26 to the right. This moves the lower end portion 52 of the inner shoe lever 11 to the right and applies the shoes 14 and 15 to the wheel 16 with a force proportional to the amount of pull on the armature plate 25.

From the foregoing, it is seen that as the linings 68 wear, it is necessary to adjust the bolt 78 of the adjustment means 77 to insure proper clearance of the shoe 14 and to adjust the length of the tie-rod 19 to equalize the shoe clearance.

A wiring diagram of a suitable control system for controlling the energization of the coils 34 and 35 is shown in Fig. 5. Referring to Fig. 5, a brake pedal 110 suitably pivoted at 111 is arranged to be moved downwardly against the force of a spring 112. Initial downward movement of the pedal 110 closes spring-biased contacts 114 to complete a circuit from a conductor 115 constituting one side of a suitable source of direct current through the coil 34 to the other side of the source represented by the conductor 116. Thus initial movement of the pedal 110 causes energization of the coil 34 and release of the brake. Subsequent movement of the pedal 110 in the down direction causes closure of spring-biased contacts 118 which complete a circuit from the conductor 115 through a suitable rheostat 119, shown as of the carbon-pile type, and the coil 35 to the negative conductor 116. The coil 35 is thus initially energized at a low value determined by the uncompressed resistance of the rheostat 119, and causes the shoes 14 and 15 to engage the wheel 16 and exert a low braking force. Further downward movement of the pedal 110 compresses the carbon discs of the rheostat 119 reducing the resistance and accordingly increasing the energization of the coil 35. Increased energization of the coil 35 causes the armature plate 25 to exert increased force on the lever 11. Thus the degree of brake application can be controlled by the extent of depression of the pedal 110. Release of the brake is accomplished by relieving pressure on the brake pedal 110, permitting the spring 112 to force the pedal upwardly and open the contacts 118 and 114. Should power fail at any time, the coil 34 becomes deenergized and the spring 21 immediately applies the brake with the maximum adjusted force.

It is apparent that other suitable systems can be used to energize the coil 34 and then to energize and increase and decrease the energization of the coil 35. For example, a modified system is shown in Fig. 6. Here a brake pedal 130, suitably pivoted at 131, is arranged to move downwardly against the force of a spring 132. Initial downward movement of the pedal 130 closes spring-biased contacts 134 to complete an obvious circuit for the coils 34 and 35. Energization of the coil 34 deactivates the spring, but concurrent energization of the coil 35 keeps the shoes applied to the wheel. As the pedal 130 is moved further in the down direction, a rheostat arm 135, pivoted at 136, moves to insert more and more of a resistor 138 in series with the coil 35, causing its energization to diminish and reduce the braking torque. Finally, the pull of the coil 35 becomes small enough to permit the shoes 14 and 15 to separate from the wheel. Release of the pedal 130 causes braking torque to be applied in an increasing amount until the contacts 134 open to deenergize the coil 34, thereby permitting the spring 21 to set the brake.

Having thus described my invention, I claim:

1. A braking device comprising brake applying means movable towards and away from brake applying position, first motive means electrically energizable to move said brake applying means towards said brake applying position, force exerting means urging said brake applying means towards said brake applying position, second motive means electrically energizable to restrain said force exerting means, support means supporting said first and second motive means in a flux conductive relationship in which at least some of the flux from one of said motive means may thread the other of said motive means, and a flux conductive means carried by the support means and interposed between said first and second motive means to shunt the flux from one motive means away from the other motive means.

2. A brake comprising brake means having a brake applying operation and a brake releasing operation, first electromotive means coupled to said brake means and electrically energizable to effect said brake applying operation of said brake means only while said first electromotive means is electrically energized, force exerting means coupled to said brake means and urging said brake applying operation of said brake means, second electromotive means operatively associated with said force exerting means and electrically energizable to restrain the urging of said force exerting means only while said second electromotive means is electrically energized, supporting means supporting one of said electromotive means in the field of magnetic flux of the other of said electromotive means, and a magnetic shunt shunting said one of said electromotive means to limit the number of magnetic lines of flux passing from said other of said electromotive means through said one of said electromotive means.

3. A brake comprising brake means having a brake applying operation and a brake releasing operation, first electromotive means coupled to said brake means and electrically energizable to effect said brake applying operation of said brake means only while said first electromotive means is electrically energized, force exerting means coupled to said brake means and urging said brake applying operation of said brake means, second electromotive means operatively associated with said force exerting means and electrically energizable to restrain the urging of said force exerting means only while said second electromotive means is electrically energized, supporting means supporting one of said electromotive means in the field of magnetic flux of the other of said electromotive means, and a single shunt simultaneously and magnetically shunting both of said electromotive means to limit the number of magnetic lines of flux passing from either electromotive means through the other electromotive means.

4. A braking device comprising brake applying means movable towards and away from brake applying position, first electromagnetic means electrically energizable to move said brake applying means towards said brake applying position, force exerting means urging said brake applying means towards said brake applying position, second electromagnetic means electrically energizable to restrain said force exerting means, each of said electromagnetic means including a flux path defined by stationary flux conductive means and movable flux conductive means movable relative to the stationary flux conductive means to provide an air gap in the said flux path, and shunt means common to both flux paths and forming a flux conductive shunt for each flux path around the air gap in the other flux path.

5. The structure of claim 4 wherein the stationary flux conductive means of the first and second electromagnetic means are interjoined with said shunt means and extend outwardly in respective opposite directions from said shunt means.

6. A brake including a mounting frame, coil support means supported by the frame and comprising a unitary generally cylindrical shaped body fully containing a pair of operating coils disposed in coaxial relationship to one another and to the body, brake applying bar means at one side of the body, a pair of armatures pivoted at the other side of the body, each by one of its ends, for swinging toward and away from the body endwise of the coils, each armature having its opposite end portion free and each being responsive to the coil adjacent to it so that upon energization of either coil the armature adjacent to it is swung toward the body, and, upon deenergization of either coil, the armature adjacent to it is released for movement away from the body, said free end portion of said armatures operatively engaging said bar means for moving said bar means linearly toward a braking position when said one armature swings in a direction toward the body, return means for returning the bar means and the free end portion of said one armature in the opposite direction, said mounting frame including a pair of spaced apart side walls extending endwise of the body and disposed entirely at said one side of said body and containing said brake applying bar means, said return means, said free end portions of said movable armatures, a manual release rod and brake applying compression spring, said bar means being operable when moved toward said braking position to move a pair of braking shoes to braking position, said brake-applying spring being disposed in generally parallel spaced relation to said release rod and concentric therewith and operative normally to urge said shoes to braking position and compressible to release said shoes for return movement of said shoes out of braking position, and said free end portion of the other of said armatures operatively engaging said spring so that when said other armature swings in a direction toward the body about its pivot the spring is compressed and, when said other armature swings in the opposite direction, the spring urges said shoes to braking position.

7. The structure according to claim 6 wherein said body means has flux conducting means simultaneously defining a magnetic path for the flux produced by any one of said flux producing means, and a magnetic shunt path shunting the remaining of said flux producing means.

References Cited in the file of this patent
UNITED STATES PATENTS

| | | |
|---|---|---|
| 837,400 | Grosvenor | Dec. 4, 1906 |
| 2,065,259 | Ball et al. | Dec. 22, 1936 |
| 2,515,468 | Piron | July 18, 1950 |
| 2,792,080 | Dunlop | May 14, 1957 |

FOREIGN PATENTS

| | | |
|---|---|---|
| 1,073,063 | France | Mar. 17, 1954 |
| 138,092 | Switzerland | Apr. 16, 1930 |